United States Patent
Parkinson

(10) Patent No.: US 7,908,315 B2
(45) Date of Patent: Mar. 15, 2011

(54) LOCAL INSTALLATION OF REMOTE SOFTWARE SYSTEMS AND METHODS

(75) Inventor: Greg Parkinson, Orem, UT (US)

(73) Assignee: Ancestry.com Operations Inc., Provo, UT (US)

( * ) Notice: Subject to any disclaimer, the term of this patent is extended or adjusted under 35 U.S.C. 154(b) by 1056 days.

(21) Appl. No.: 11/342,251

(22) Filed: Jan. 26, 2006

(65) Prior Publication Data

US 2007/0174422 A1    Jul. 26, 2007

(51) Int. Cl.
*G06F 15/16* (2006.01)

(52) U.S. Cl. .......................... 709/203; 709/224

(58) Field of Classification Search .................. 709/203, 709/206, 218, 219, 224, 231
See application file for complete search history.

(56) References Cited

U.S. PATENT DOCUMENTS

| | | | | |
|---|---|---|---|---|
| 5,847,957 A * | 12/1998 | Cohen et al. | | 700/108 |
| 5,923,885 A * | 7/1999 | Johnson et al. | | 717/176 |
| 6,119,165 A * | 9/2000 | Li et al. | | 709/229 |
| 6,832,239 B1 * | 12/2004 | Kraft et al. | | 709/203 |
| 6,895,513 B1 * | 5/2005 | Balasubramaniam et al. | | 726/24 |
| 7,634,772 B2 * | 12/2009 | Parthasarathy et al. | | 717/178 |
| 2001/0054064 A1 * | 12/2001 | Kannan | | 709/203 |
| 2002/0059378 A1 * | 5/2002 | Mustafa | | 709/205 |
| 2002/0087661 A1 * | 7/2002 | Matichuk et al. | | 709/218 |
| 2002/0091782 A1 * | 7/2002 | Benninghoff, III | | 709/206 |
| 2002/0093923 A1 * | 7/2002 | Bouet | | 370/328 |
| 2002/0157091 A1 * | 10/2002 | DeMello et al. | | 717/178 |
| 2003/0132970 A1 * | 7/2003 | Lehmeier et al. | | 345/789 |
| 2003/0135587 A1 * | 7/2003 | Fisher et al. | | 709/219 |
| 2003/0145316 A1 * | 7/2003 | McKinlay et al. | | 717/173 |
| 2003/0149653 A1 * | 8/2003 | Penney et al. | | 705/37 |
| 2004/0039775 A1 * | 2/2004 | Yoshida et al. | | 709/203 |
| 2004/0039794 A1 * | 2/2004 | Biby et al. | | 709/217 |
| 2005/0083924 A1 * | 4/2005 | Dillinger et al. | | 370/389 |
| 2005/0131831 A1 * | 6/2005 | Fieldson | | 705/59 |
| 2005/0193139 A1 * | 9/2005 | Vinson et al. | | 709/231 |
| 2005/0251800 A1 * | 11/2005 | Kurlander et al. | | 717/174 |
| 2006/0031785 A1 * | 2/2006 | Raciborski | | 715/859 |
| 2006/0277281 A1 * | 12/2006 | Compas et al. | | 709/221 |
| 2007/0294373 A1 * | 12/2007 | Harrison | | 709/219 |
| 2008/0120113 A1 * | 5/2008 | Loyall et al. | | 704/270 |

FOREIGN PATENT DOCUMENTS

| | | | |
|---|---|---|---|
| GB | 2288044 A | * | 10/1995 |
| JP | 2002049436 A | * | 2/2002 |

OTHER PUBLICATIONS

Jaeger et al. Flexible Control of Downloaded Executable Content ACM Transactions on Information and System Security, vol. 2, No. 2, May 1999, pp. 177-228.*

* cited by examiner

*Primary Examiner* — Wing F Chan
*Assistant Examiner* — Kostas Katsikis
(74) *Attorney, Agent, or Firm* — Kilpatrick Townsend & Stockton LLP

(57) ABSTRACT

A method of downloading software to a user computer via a network includes, at a host computer system, receiving a request to download software to the user computer, storing at the host computer system identification information relating to the user computer, sending a download executable to the user computer, receiving status information from the download executable at the host computer system, and using the identification information to send the status information from the host computer system to the user computer for display on the user computer.

17 Claims, 3 Drawing Sheets

LOCAL INSTALLATION OF REMOTE SOFTWARE SYSTEMS AND METHODS

BACKGROUND OF THE INVENTION

Embodiments of the present invention relate generally to downloading and/or installing software. More specifically, embodiments of the invention relate to systems and methods for locally downloading and/or installing remotely-located software.

As network utilization for computer users becomes more widespread, users more frequently encounter the need to obtain software (e.g., applications, data files, drivers, documents, etc.) via a network such as the Internet. Users typically obtain the software by selecting a link on a web page displayed in a web browser. Selecting the link begins a process that results in the software being downloaded to the user's computer. In some cases, the software is thereafter installed. For a number of reasons, however, this process fails to produce the most efficient and user friendly software installation.

In a web browser session, installing software often takes longer than resolving a web page. Users—especially unsophisticated users—often become impatient because they think their web browser has stalled, they've lost their network connection, or the like. As a result, users may close and reopen the browser session, re-click the link they selected to initiate the software download, and/or the like. All of these actions interrupt, delay, or otherwise interfere with the software installation process.

Some have attempted to address these shortcomings by having a dialog box open and display the status of the download and installation. This fails to fully address the problem, however, because the dialog box may become hidden behind other windows on the user's desktop (i.e., the browser may shift "focus" back to the web page or another window), in which case, the user no longer has information about the status of the download.

For at least the foregoing reasons, improved systems and methods are needed for downloading software via a network.

BRIEF SUMMARY OF THE INVENTION

Embodiments of the invention provide a method of downloading software to a user computer via a network. The method includes, at a host computer system, receiving a request to download software to the user computer, storing at the host computer system identification information relating to the user computer, sending a download executable to the user computer, receiving status information from the download executable at the host computer system, and using the identification information to send the status information from the host computer system to the user computer for display on the user computer.

In some embodiments, receiving a request to download software to the user computer includes receiving the request via a selection of a hyperlink in a web page displayed in a web browser at the user computer. The status information may be displayed on the user computer via the web page. The software may be an application, an applet, a data file, a document, and/or a driver. The identification information may be an IP address of the user computer. The identification information may include a session identifier of a web browser session on the user computer. The method also may include receiving status information from the download executable relating to installation of the software at the user computer and using the identification information to send the status information relating to installation of the software from the host computer system to the user computer for display on the user computer.

In some embodiments, a method of obtaining software at a local machine from a remote machine includes, at the local machine, initiating a web browser session. A web page is running in a web browser, the browser session has associated therewith a session identifier, and the local machine has an address associated therewith. The method also includes, at the local machine, receiving a user selection on the web page to thereby initiate a software download, at the remote machine, receiving an indication of the user selection via the web page, at the remote machine, storing identification information relating to the local machine, sending an executable file from the remote machine to the local machine, at the local machine, using the executable file to initiate the software download, sending status information from the executable file at the local machine to the remote machine, using the identification information relating to the local machine stored at the remote machine to route the status information to the local machine, and displaying the status information on the web page.

The identification information may include the address associated with the local machine, a web browser session identifier associated with the web browser session, and/or the like. Receiving a user selection on the web page may include a selection of a hyperlink, a command, a selection from a drop down menu, a selection of a button, and/or the like. The software may be an application, an applet, a data file, a document, driver, and/or the like. The status information may be information relating to installation of the software.

In still other embodiments, a system for sending software from a remote machine to a local machine includes a processor at the remote machine, communication means for communicably coupling the remote machine to the local machine and computer-executable code. The computer-executable code programs the remote machine to receive a user-initiated request from the local machine to obtain the software, store identification information relating to the local machine, send an executable file from the remote machine to the local machine, send the software to the local machine, receive status information from the executable file, and use the stored identification information to route the status information to the local machine for display at the local machine.

The communication means may be the Internet, an intranet, and/or the like. The user-initiated request may be a selection of a hyperlink, a command, a selection from a drop down menu, a selection of a button, and/or the like. The software may be an application, an applet, a data file, a document, a driver and/or the like. The status information may include information relating to installation of the software. The identification information may be the address associated with the local machine, a web browser session identifier associated with a web browser session on the local machine, and/or the like.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

According to embodiments of the invention, a user is able to download, and in some embodiments install, software received from a remote machine without shifting "focus" from a web page containing a link the user selected to initiate the download. Further, the user is able to monitor the status of the download (and install) from the same page. This prevents the user from re-selecting the link, thereby initiating a second instance of the software download and/or terminating the present download among other things.

Method embodiments according to the present invention include storing address information relating to the user machine at a remote machine associated with the software being downloaded. An applet (e.g., executable file) is first downloaded to the user machine. The applet is embedded in the web page and monitors and controls the downloading of the software and reports status back to the remote machine. The remote machine forwards the status back to the user machine for display as part of the web page from which the user initiated the download.

The software may be any of a variety of electronic files including executable files, data files, drivers, documents, and/or the like. In addition to initiating the download by selecting a hyperlink, the user may initiate the download by making a selection from a dropdown menu, selecting a button, entering a command, and/or the like. In any case, the "focus" of the web browser may be maintained on the web page or the browser window from which the download was initiated. In some embodiments, focus may be shifted to a different web page in the same browser for displaying the status information.

Figure 1:
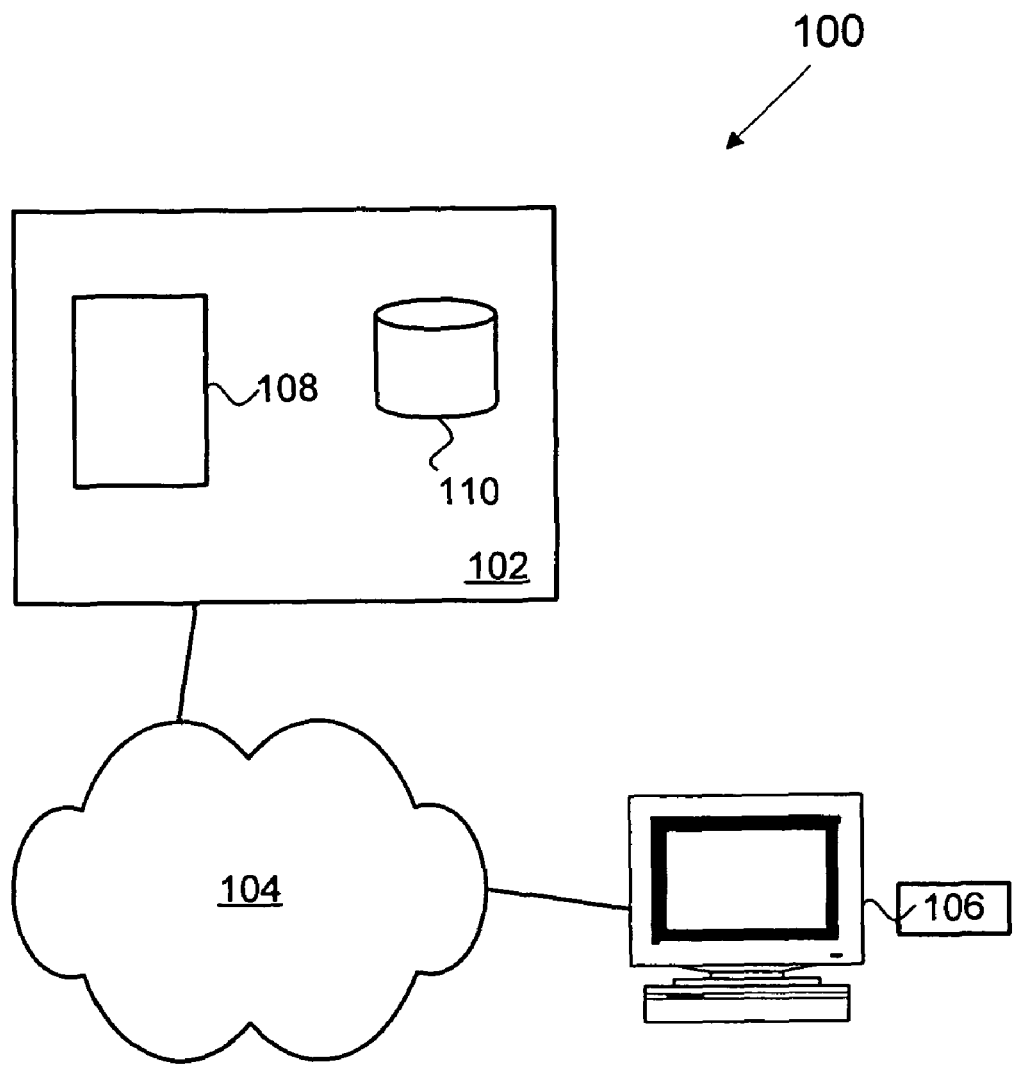
FIG. 1 illustrates an exemplary system according to embodiments of the invention.

Having described embodiments of the invention generally, attention is directed to FIG. 1, which illustrates an exemplary system 100 according to embodiments of the invention in which system method embodiments of the invention may be deployed. Those skilled in the art will appreciate that the system 100 is merely exemplary of a myriad of possible embodiments according to the invention. The system 100 includes a host computer system 102 (i.e., "remote" computer or machine) and a network 104 through which a user computer 106 (i.e., "local" computer or machine) and the host computer system 102 communicate. The host computer system 102, in this embodiment, includes a web server 108 and a data storage arrangement 110, although other embodiments of the host computer system 102 may include more, fewer, or different components than those illustrated and described herein. Further, the components of the host computer system 102 may all be located in the same geographic area—even being comprised by the same machine—or distributed geographically.

The web server 108 may be any of a variety of computing devices. It hosts web pages that are sent to user computers upon request as is known in the art. The data storage arrangement 110 may be any of a variety of data storage devices. It stores information relating to user web browser sessions and/or software available for download by users.

The network 104 may be any of a variety of wired or wireless networks, including intranets, the Internet, and/or the like or any combination thereof.

The user computer 106 may be any suitable computing device. Using the user computer 106, a user may initiate a web browser session in which web pages are requested from the web server 108. One of the web pages contains a selection mechanism (e.g., hyperlink, dropdown menu, command line, and/or the like) which the user may select to initiate a software download. Without shifting focus from the web page (i.e., the web page remains "active"), the host computer 102 is able to direct an applet to the user computer 106 to accomplish the download. The applet communicates status of the software download back to the host computer system 102 for relay back to the user computer 106 for display as part of the web page. The process will be described in greater detail immediately hereinafter with reference to FIGS. 2 and 3.

Figure 2:
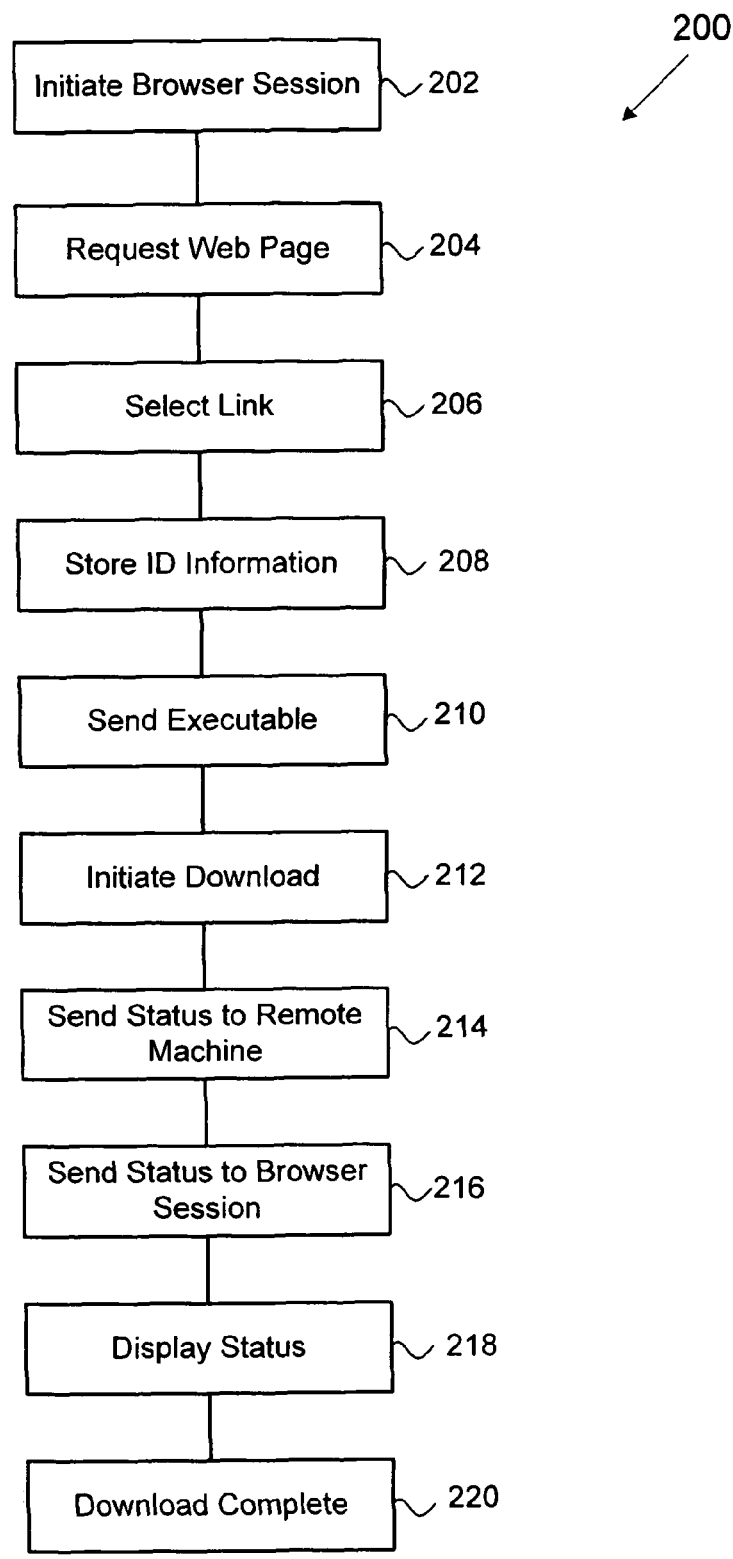
FIG. 2 illustrates a method according to embodiments of the invention, which method may be implemented in the system of FIG. 1.

FIG. 2 illustrates an exemplary method 200 of downloading software from a remote machine to a local machine according to embodiments of the invention. The remote machine may be, for example, the host computer system 102 of FIG. 1, while the local machine may be the user computer 106 of FIG. 1. Those skilled in the art will appreciate that the method 200 is merely exemplary of a number of possible embodiments according to the invention. Other embodiments may have more, fewer, or different steps than those illustrated and described herein. Further, other exemplary methods according to other embodiments may traverse in different orders the steps illustrated and described herein.

Figure 3:
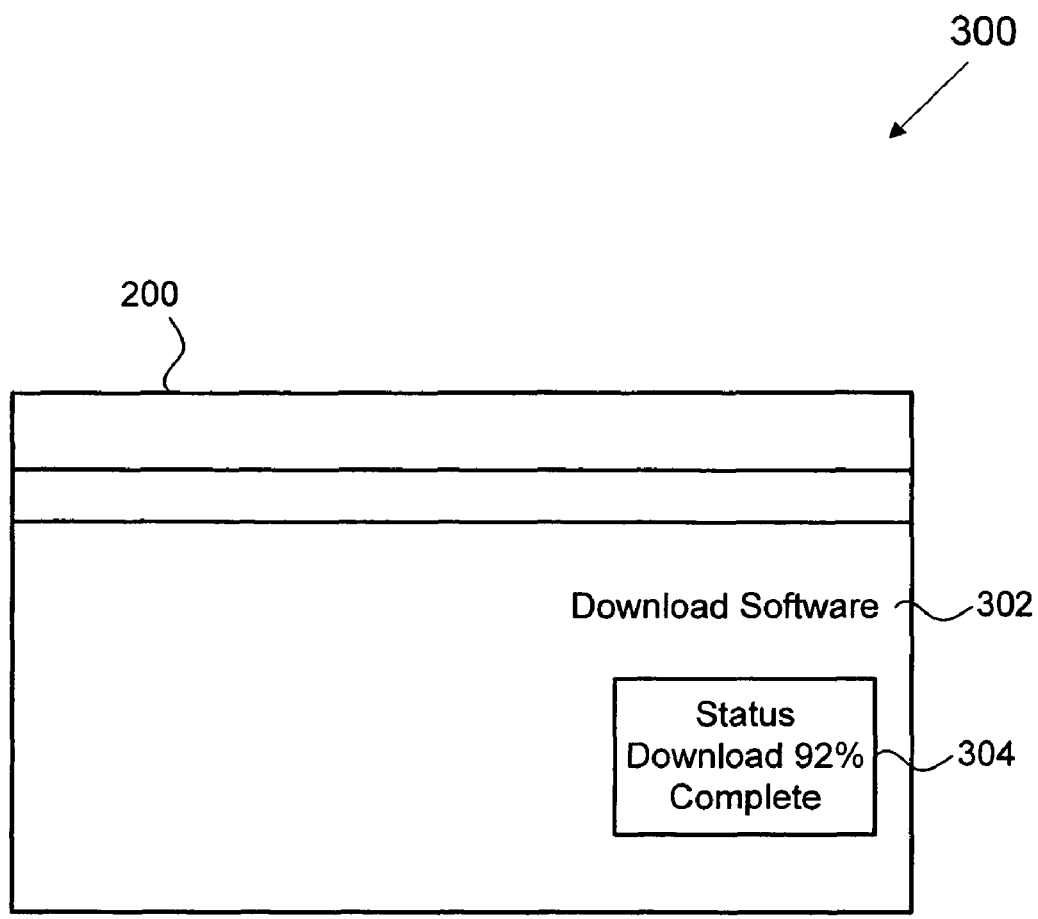
FIG. 3 illustrates an exemplary web browser window that may be displayed on, for example, the user computing device of FIG. 1.

Continuing with the method 200, at block 202, a user initiates a web browser session on the local machine. The browser session has a browser identifier (i.e., a browser session ID or simply "session ID") associated with it. The local machine has an address (e.g., an Internet Protocol, or IP, address) associated with it. During the browser session, the user, at block 204, requests one or more web pages from a web server, such as the web server 108. An exemplary display screen showing a browser window 300 according to embodiments of the invention is illustrated at FIG. 3. The browser window 300 includes a hyperlink 302 for downloading software. At block 206, the user selects the hyperlink, thereby initiating a process to download software.

At block 208, the remote machine stores identification information (e.g., the local machine's IP address, the browser session ID, and/or the like) relating to the requesting machine. The remote machine also sends an executable file (e.g., an applet) to the local machine at block 210. The applet may be, for example, an ActiveX applet or the like. The applet initiates and/or controls the software download at the local machine at block 212. The software being downloaded may be stored at the storage arrangement 110 of FIG. 1, for example.

At block 214, the applet sends download status information back to the remote machine. The status information may include, for example, the progress toward completing the software download. If the download includes installation, the status information also may include installation status as well.

At block 216, the remote machine uses the stored identification information to route the download status information to the web browser session at the local machine. The local machine then displays the download status information at block 218. The download status information may be displayed, for example, in a status area 304 of the browser window 300. Hence, the user is able to monitor the status of the download without having the local machine shift focus from the web page through which the user initiated the download.

The actions of blocks 214, 216, and 218 continue until the software download and/or installation are complete and the process terminates at block 220.

In some embodiments, the applet that is downloaded from the remote machine to the local machine to monitor and/or control the download and/or installation is a sufficiently small file that it can be downloaded and executed in a relatively short period of time as compared to typical software downloads. As a result, the user is not left wondering as to the status of the action and is, therefore, not tempted to re-select the hyperlink or other mechanism used to initiate the download. Users tend to develop a tolerance for latency in web browser sessions. Having an executable file download, execute, and return status to the web browser in a relatively short period of time minimizes the possibility that the user's tolerance will be exceeded.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A method of downloading software to a user computer via a network, comprising:
    at a host computer system, receiving a request to download a software application to the user computer via a selection in a web page displayed in a web browser at the user computer;
    storing at the host computer system identification information relating to the user computer;
    sending an applet to the user computer, wherein the applet is configured to direct downloading of the software application;
    embedding the applet within the web page in the web browser of the user computer;
    sending, by the applet, the software application to the user computer;
    in response to the sending of the software application, graphically displaying, via the applet, download status of the software application;
    during the displaying of the download status of the software application, maintaining focus of the web browser on the web page which includes the applet;
    receiving status information from the software application at the host computer system relating to the download of the software application at the user computer; and
    using the identification information to send the status information relating to the download of the software application from the host computer system to the applet on the user computer for continuing display within the applet embedded in the web page within the web browser on the user computer.

2. The method of claim 1, wherein receiving a request to download software to the user computer comprises receiving the request via a selection of a hyperlink in a web page displayed in a web browser at the user computer.

3. The method of claim 1, wherein the software comprises a selection from the group consisting of application, applet, data file, document, and driver.

4. The method of claim 1, wherein the identification information comprises an IP address of the user computer.

5. The method of claim 1, wherein the identification information comprises a session identifier of a web browser session on the user computer.

6. The method of claim 1, further comprising:
    receiving status information from the download executable relating to installation of the software at the user computer; and
    using the identification information to send the status information relating to installation of the software from the host computer system to the user computer for display as part of the web page on the user computer.

7. A method of obtaining software at a local machine from a remote machine, comprising:
    at the local machine, initiating a web browser session, wherein a web page is running in a web browser, wherein the browser session has associated therewith a session identifier, and wherein the local machine has an address associated therewith;
    at the local machine, receiving a user selection on the web page to thereby initiate a software application download;
    at the remote machine, receiving an indication of the user selection via the web page;
    at the remote machine, storing identification information relating to the local machine;
    sending an applet from the remote machine to the local machine, wherein the applet is configured to direct downloading of the software application;
    embedding the applet within the web page in the web browser of the local machine;
    at the local machine, using the applet to initiate the software application download;
    sending status information from the software application at the local machine to the remote machine, the status information comprising information relating to the download of the software application at the local machine;
    using the identification information relating to the local machine stored at the remote machine to route the status information relating to the download of the software application to the applet within the web page in the web browser of the local machine; and
    displaying the status information relating to the download of the software application as part of the web page, wherein during the displaying of the status information of the software application, maintaining focus of the web browser on the web page which includes the applet.

8. The method of claim 7, wherein the identification information comprises a selection from the group consisting of:
    the address associated with the local machine; and
    a web browser session identifier associated with the web browser session.

9. The method of claim 7, wherein receiving a user selection on the web page comprises a selection from the group consisting of:
    a selection of a hyperlink;
    a command;
    a selection from a drop down menu; and
    a selection of a button.

10. The method of claim 7, wherein the software comprises a selection from the group consisting of application, applet, data file, document, and driver.

11. The method of claim 7, wherein the status information further comprises information relating to installation of the software, and wherein the status information relating to installation of the software is displayed as part of the web page.

12. A system for sending software from a remote machine to a local machine, comprising:
   a processor at the remote machine;
   communication means for communicably coupling the remote machine to the local machine; and
   computer-executable code that programs the remote machine to:
      receive a user-initiated request from the local machine to download a software application, wherein the software application is displayed as part of a web page in a web browser at the local machine, wherein the user-initiated request is a selection from the web page displayed at the local machine,
      store identification information relating to the local machine;
      send an applet from the remote machine to the local machine, wherein the applet is configured to direct downloading of the software application;
   embedding the applet within the web page in the web browser of the user computer;
      send, by the applet, the software application to the local machine;
      in response to the sending of the software application, graphically displaying, via the applet, download status of the software application;
      during the displaying of the download status of the software application, maintaining focus of the web browser on the web page which includes the applet;
      receive status information from the software application, wherein the status information comprises information relating to the download of the software application; and
      use the stored identification information to route the status information to the applet within the web page in the web browser of the local machine for display as part of the web page at the local machine.

13. The system of claim 12, wherein the communication means comprises a selection from the group consisting of:
   the Internet; and
   an intranet.

14. The system of claim 12, wherein the user-initiated request comprises a selection from the group consisting of:
   a selection of a hyperlink;
   a command;
   a selection from a drop down menu; and
   a selection of a button.

15. The system of claim 12, wherein the software comprises a selection from the group consisting of application, applet, data file, document, and driver.

16. The system of claim 12, wherein the status information further comprises information relating to installation of the software, and wherein the status information relating to installation of the software is displayed at the local machine as part of the web page.

17. The system of claim 12, wherein the identification information comprises a selection from the group consisting of:
   the address associated with the local machine; and
   a web browser session identifier associated with a web browser session on the local machine.

* * * * *